United States Patent [19]

Adamo et al.

[11] 4,426,156
[45] Jan. 17, 1984

[54] POLYELECTROLYTE WETTING APPARATUS

[75] Inventors: Rosario Adamo, Belleville; Arthur H. Patch, Wayne, both of N.J.

[73] Assignee: Pennwalt Corporation, Philadelphia, Pa.

[21] Appl. No.: 407,688

[22] Filed: Aug. 13, 1982

[51] Int. Cl.$^3$ .............................................. B01F 15/02
[52] U.S. Cl. .................................. 366/156; 366/165; 366/181
[58] Field of Search ............... 366/156, 165, 181, 184, 366/177, 341, 183, 27, 163, 167, 191

[56] References Cited

U.S. PATENT DOCUMENTS

| | | | |
|---|---|---|---|
| 1,541,352 | 6/1925 | Halliburton | 366/5 |
| 2,005,800 | 6/1935 | Boyle | 366/167 |
| 3,064,680 | 11/1962 | Winslow | 366/341 X |
| 3,995,838 | 12/1976 | Zucker | 366/165 X |

Primary Examiner—Robert W. Jenkins

[57] ABSTRACT

Powdered polyelectrolytes are wetted and mixed with water in a cone-shaped member to form solutions which are useful, for example, in promoting floc formation for removal of suspended particulate matter. Improperly wetted and/or mixed powders tend to form lumps to periodically clog the throat of an eductor conventionally employed in the formation of such solutions. The present invention employs an orificed disc to form multiple jets of high velocity water to impact any lumps exiting from the lower portion of the cone-shaped member for break-up of said lumps to thereby provide a lump-free solution which does not clog the throat of an eductor disposed downstream of the orificed disc, the eductor educing the lump-free solution into an aging and/or storage tank.

10 Claims, 4 Drawing Figures

POLYELECTROLYTE WETTING APPARATUS

STATEMENT OF THE INVENTION

This invention relates to improved apparatus for providing lump-free solutions of polyelectrolyte powders to thereby eliminate periodic clogging of the throat of an eductor conventionally employed in apparatus of this type.

BACKGROUND AND SUMMARY OF THE INVENTION

It is known that the addition of a low concentration solution of various polyelectrolytes to sewage or wastewater effluent, for example, will promote floc formation of unwanted particulate matter suspended therein. Such solutions are also useful in the treatment of potable waters, as an aid in various filtration processes, and the like. The finely divided polyelectrolyte material is wetted and mixed and the resultant mixture emptied into an aging and/or storage tank by means of an eductor.

Many of the polyelectrolyte family of materials however, produce sticky lumps and "fish-eyes" when improperly wetted and/or mixed, which lumps and fish-eyes accumulate in the throat of the eductor to periodically plug or clog it, thus causing the wetting and mixing vessel to overflow. Removing and cleaning the sticky build-up of lumpy material from the eductor throat, often quite inaccessible, is a difficult, messy and time-consuming task.

The present invention eliminates the plugging and clogging of all internal surfaces of piping leading to and including the eductor throat by providing an orificed disc which causes the polyelectrolyte-water mixture, upon leaving the wetting and mixing vessel, to be impacted by multiple jets of high-velocity water to thereby provide a lump-free solution prior to passage of the lump-free solution through the eductor throat.

DETAILED DESCRIPTION OF THE INVENTION

Figure 1:
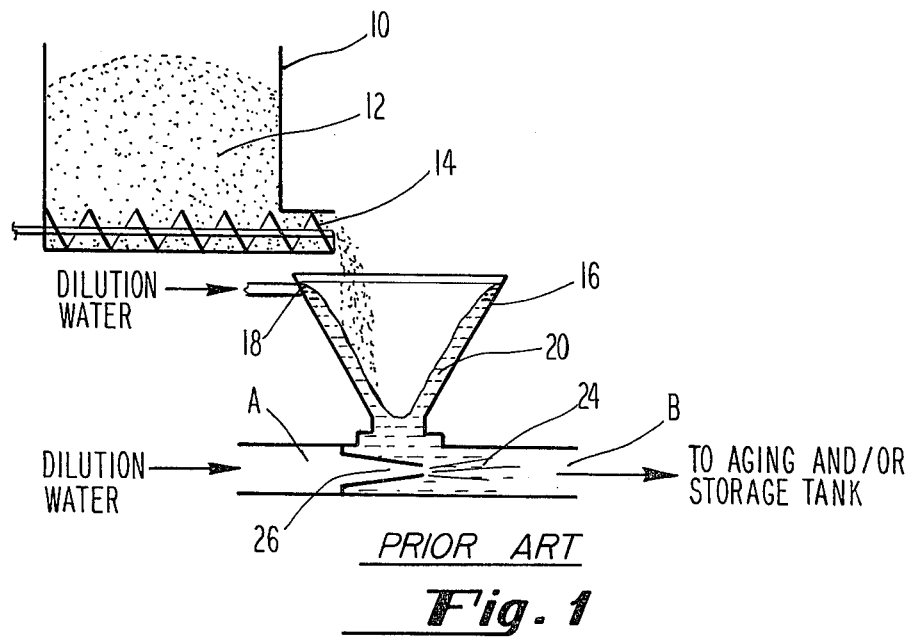
FIG. 1 is a diagrammatic illustration of existing polyelectrolyte powder wetting apparatus of the assignee of the present invention.

In FIG. 1, a hopper 10 contains the powdered polymer or polyelectrolyte 12 to be wetted, mixed, and disolved. A screw feeder 14 disposed adjacent a lowermost portion of hopper 10 feeds the powder 12 into an open-ended, funnel-shaped cone member 16. Water is introduced into an upper portion of cone 16 at inlet 18 to impinge tangentially horizontally against the lining of the cone, causing water to swirl around the lining while wetting the powder 12 falling thereinto from hopper 10, providing a swirling polyelectrolyte-water mixture 20. Eductor 24, horizontally disposed below cone 16, receives dilution water from pipe A and educes the polyelectrolyte-water mixture 20 from cone 16 into an aging and/or storage tank (not shown) through pipe B.

As aforementioned, plugging and clogging of throat 26 of eductor 24 periodically results from the lumps and fish-eyes formed in cone 16 during the swirling of water therein.

Figure 2:
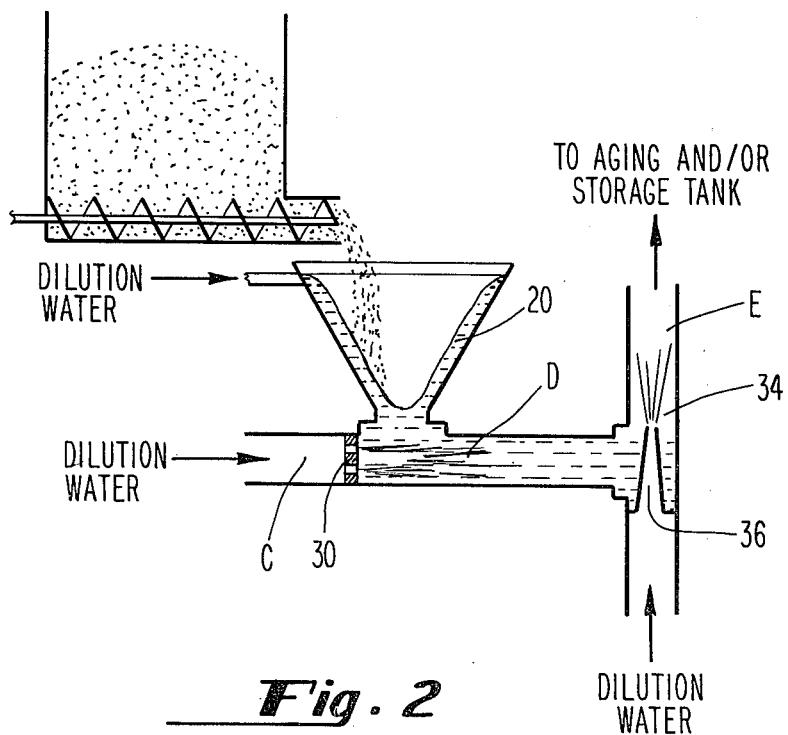
FIG. 2 is a diagrammatic illustration of improved polyelectrolyte powder wetting apparatus in accordance with the present invention.

In FIG. 2, the polyelectrolyte-water mixture 20, upon falling from cone 16, is immediately impacted by a multiplicity of jets of high-velocity water caused by dilution water in pipe C being forced through an orificed member 30. Any undissolved polyelectrolyte powder in the form of lumps or fish-eyes is effectively broken up by the high-velocity jets of water.

The impacted, lump-free, wetted and mixed polyelectrolyte solution travels through pipe D and is educed into pipe E for emptying into an aging and/or storage (not shown) by means of an eductor 34. Because of the complete break-up of lumps and fish-eyes caused by the high-velocity jets, throat 36 of eductor 34 remains clear even after prolonged and sustained operation of the apparatus.

Figure 3:
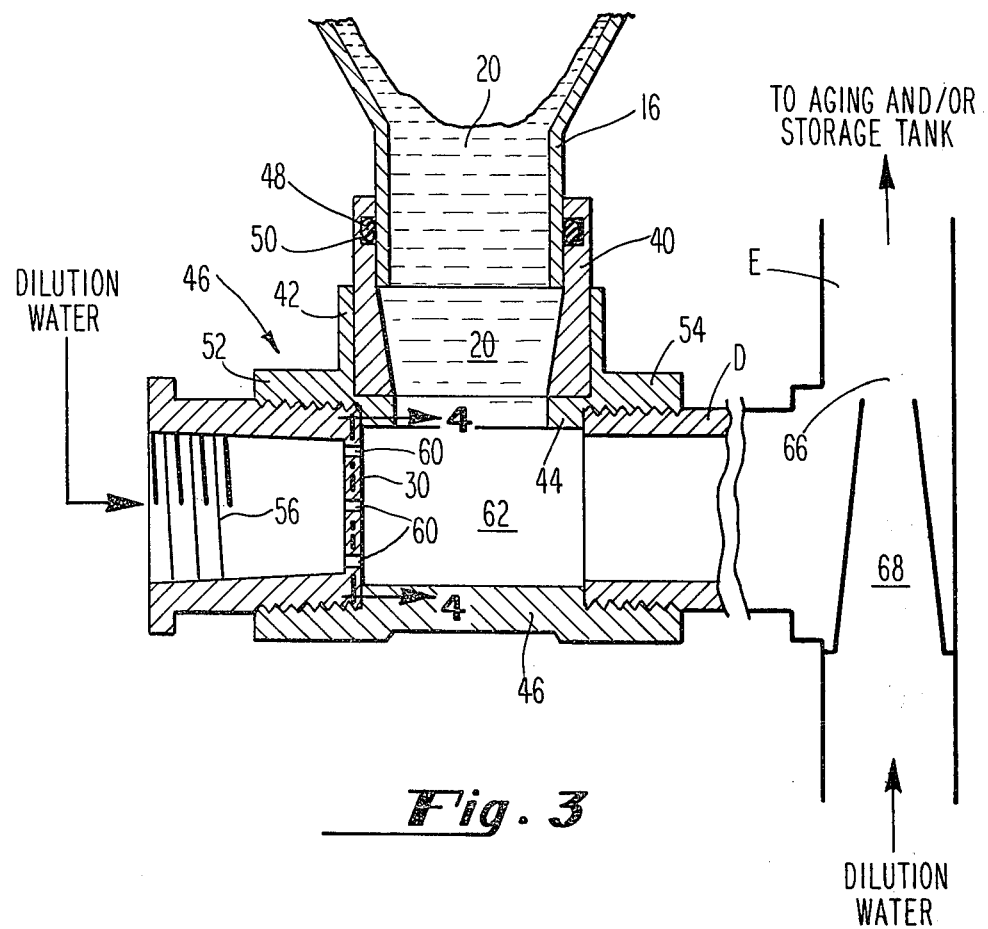
FIG. 3 is a sectional view, partially diagrammatic, of a portion of the apparatus of FIG. 2.

In FIG. 3, cone 16 is received within and supported by a tapered sleeve 40, which, in turn, is supported by an upright portion 42 and annular projection 44 of a T-forming member 46. Sleeve 40 is provided with an annular groove 48 which carries an O-ring 50 to prevent leakage of the polyelectrolyte-water mixture 20. T-forming member 46 includes a pair of opposed branches 52 and 54, into which are threadedly mounted orificed disc 30 and pipe D respectively. Pipe C (FIG. 2) will be threadedly mounted to orificed disc 30 at 56.

Figure 4:
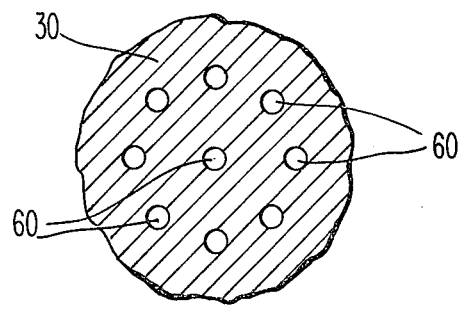
FIG. 4 is a sectional view of the orificed disc of FIG. 3 taken along line 4—4 thereof.

Dilution water from pipe C is forced through a plurality of spaced orifices 60 (FIG. 4) of disc 30 to provide a multiplicity of jets of high-velocity water which impact the polyelectrolyte-water mixture 20 falling through tapered sleeve 40 into space 62 centrally disposed within T-forming member 46. Any lumps and fish-eyes in mixture 20 are immediately and effectively broken up and discharged into pipe D as a polyelectrolyte solution where it is educed into pipe E by means of eductor 66 for discharge into an aging and/or storage tank (not shown). Throat 68 of eductor 66, as aforementioned, is no longer plugged by the lumps and fish-eyes, thus eliminating a frequent and messy task.

Typically, orifices 60 will measure 1/16" to 3/32" for medium and high capacity systems respectively. The invention, of course, is not limited to these sizes, and combinations of various sized orifices may be used on a single orificed disc 30.

We claim:

1. Apparatus for forming a lump-free solution from particulate solids comprising
    containing means for containing said solids,
    means for mixing said solids with a liquid,
    means for dispensing said solids from said containing means into said mixing means,
    means for introducing liquid into said mixing means to swirl said solids and liquid therearound to form a swirling mixture,
    means for creating a plurality of jets of high velocity liquid upstream said mixing means to impact said mixture formed in said mixing means to form said lump-free solution, and
    other means for urging said lump-free solution into aging and/or storage tanks.

2. Apparatus of claim 1 wherein said particulate solids are polyelectrolyte powders and said liquid is water.

3. Apparatus of claim 2 wherein said mixing means comprises an open-ended, funnel-shaped cone member.

4. Apparatus of claim 3 wherein said means for introducing said water into said cone member is horizontally disposed adjacent an upper portion thereof and said water impinges tangentially along lining of said cone member to form a swirling polyelectrolyte-water mixture.

5. Apparatus of claim 4 wherein said open-ended funnel-shaped cone member is vertically disposed and is provided with its smaller opening at a lower portion thereof.

6. Apparatus of claim 5 wherein said means for creating a plurality of jets of high-velocity water comprises an orificed disc and said jets of high-velocity water are formed from a first supply of dilution water fed into a first pipe.

7. Apparatus of claim 6 wherein said other means comprises an eductor downstream said orificed disc, said eductor receiving said lump-free solution through a second pipe.

8. Apparatus of claim 7 wherein said eductor is supplied with dilution water from a second supply thereof, said eductor drawing said lump-free solution from said second pipe for ejection into said aging and/or storage tank.

9. Apparatus for forming a polyelectrolyte solution from a polyelectrolyte-water mixture containing lumps and fish-eyes in association with an eductor having a throat, said lumps and fish-eyes being completely dissolved prior to passage thereof through said throat by said apparatus to prevent plugging and clogging of internal piping and said throat, said apparatus comprising an open-ended, vertically disposed tapered member having its larger opening at an upper portion thereof and its smaller opening at a lower portion thereof, means for tangentially introducing liquid adjacent said upper portion for swirling said liquid around lining of said taper member, means for dispensing finely divided polyelectrolyte powder into said swirling liquid to provide a swirling polyelectrolyte-liquid mixture including lumps and fish-eyes thereof, passageway means disposed below said lower portion of said tapered member for receiving said swirling polyelectrolyte-water mixture including said lumps and fish-eyes, means communicating with said passageway for forming a multiplicity of jets of high-velocity dilution water for impacting said swirling mixture, lumps and fish-eyes for break-up of said lumps and fish-eyes to thereby provide a lump-free polyelectrolyte solution, and an eductor downstream of said means for forming said jets for educing said lump-free polyelectrolyte solution into aging and/or storage tanks.

10. Apparatus of claim 9 wherein said means for forming said jets of high-velocity water comprises an orificed disc.

* * * * *